United States Patent
Takikawa et al.

(10) Patent No.: US 9,117,466 B2
(45) Date of Patent: Aug. 25, 2015

(54) DISK DRIVE SUSPENSION

(71) Applicant: NHK SPRING CO., LTD., Yokohama-shi, Kanagawa (JP)

(72) Inventors: Kenichi Takikawa, Aiko-gun (JP); Toshiki Ando, Aiko-gun (JP)

(73) Assignee: NHK SPRING CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/457,888

(22) Filed: Aug. 12, 2014

(65) Prior Publication Data

US 2015/0055253 A1 Feb. 26, 2015

(30) Foreign Application Priority Data

Aug. 20, 2013 (JP) .................................. 2013-170686

(51) Int. Cl.
*G11B 5/48* (2006.01)
*G11B 21/16* (2006.01)

(52) U.S. Cl.
CPC ............ *G11B 5/4833* (2013.01); *G11B 5/4826* (2013.01)

(58) Field of Classification Search
CPC .... G11B 5/4826; G11B 5/4833; G11B 5/486; G11B 5/4853; G11B 5/482; G11B 5/4873; G11B 5/5552
USPC ....................... 360/294.4, 245.7, 245.9, 245.8
See application file for complete search history.

(56) References Cited

U.S. PATENT DOCUMENTS

| | | | |
|---|---|---|---|
| 5,959,807 A * | 9/1999 | Jurgenson | 360/245.7 |
| 6,266,212 B1 * | 7/2001 | Coon | 360/234.5 |
| 6,757,137 B1 * | 6/2004 | Mei | 360/245.7 |
| 6,965,499 B1 | 11/2005 | Zhang et al. | |
| 7,663,843 B2 * | 2/2010 | Yao | 360/265 |
| 7,839,604 B1 * | 11/2010 | Coffey et al. | 360/265.9 |
| 8,000,061 B2 | 8/2011 | Zeng et al. | |
| 8,027,128 B2 * | 9/2011 | Muraki et al. | 360/245.3 |
| 8,179,745 B2 | 5/2012 | Nakamura et al. | |
| 8,208,224 B1 * | 6/2012 | Teo et al. | 360/245.3 |
| 8,488,281 B1 * | 7/2013 | Pan | 360/294.4 |
| 8,896,968 B2 * | 11/2014 | Miller et al. | 360/245.3 |
| 8,896,970 B1 * | 11/2014 | Miller et al. | 360/294.6 |
| 8,934,203 B2 * | 1/2015 | Hanya et al. | 360/294.4 |
| 2004/0246625 A1 * | 12/2004 | Tsuchida et al. | 360/244.2 |
| 2005/0117257 A1 * | 6/2005 | Thaveeprungsriporn et al. | 360/246 |
| 2007/0097554 A1 * | 5/2007 | Yao et al. | 360/294.4 |

(Continued)

FOREIGN PATENT DOCUMENTS

| | | |
|---|---|---|
| JP | 2010146631 A | 7/2010 |
| JP | 2010218626 A | 9/2010 |
| JP | 2014191855 A * | 10/2014 |

*Primary Examiner* — Will J Klimowicz
(74) *Attorney, Agent, or Firm* — Holtz, Holtz, Goodman & Chick PC (57) ABSTRACT

A slider and microactuator elements are arranged on a gimbal portion of a flexure. A conducting member includes tongue conductive circuit portions, and unsupported conductive circuit portions which do not overlap with a metal base. The unsupported conductive circuit portions are disposed between arms of an outrigger portion. Bendable portions for reducing bending stiffness are formed in the unsupported conductive circuit portions, respectively. End portions of the microactuator elements are secured to supporting portions of a tongue, respectively. Each of bridge members is provided between the corresponding supporting portion of the tongue and the corresponding unsupported conductive circuit portion.

4 Claims, 11 Drawing Sheets

(56) References Cited

U.S. PATENT DOCUMENTS

| | | |
|---|---|---|
| 2007/0115591 A1* | 5/2007 | Yao et al. .................... 360/245.3 |
| 2007/0139824 A1* | 6/2007 | Yao ............................. 360/294.4 |
| 2007/0188931 A1* | 8/2007 | Yao ............................. 360/294.4 |
| 2008/0144223 A1* | 6/2008 | Muraki et al. ............. 360/244.8 |
| 2008/0304183 A1* | 12/2008 | Kwon et al. ................ 360/245.3 |
| 2009/0268347 A1* | 10/2009 | Muraki et al. ............. 360/245.3 |
| 2010/0238581 A1* | 9/2010 | Nakamura et al. .............. 360/59 |
| 2011/0096438 A1 | 4/2011 | Takada et al. |
| 2014/0022674 A1* | 1/2014 | Takikawa et al. .......... 360/244.5 |
| 2014/0022675 A1* | 1/2014 | Hanya et al. ............... 360/244.5 |

* cited by examiner

DISK DRIVE SUSPENSION

CROSS-REFERENCE TO RELATED APPLICATIONS

This application is based upon and claims the benefit of priority from prior Japanese Patent Application No. 2013-170686, filed Aug. 20, 2013, the entire contents of which are incorporated herein by reference.

BACKGROUND OF THE INVENTION

1. Field of the Invention

This invention relates to a disk drive suspension comprising a tongue on which a slider is mounted, and a conducting member connected to the slider.

2. Description of the Related Art

A hard disk drive (HDD) is used in an information processing apparatus such as a personal computer. The HDD comprises a magnetic disk rotatable about a spindle, a carriage turnable about a pivot, etc. The carriage comprises an actuator arm, and is configured to be turned transversely relative to tracks of the disk about the pivot by a positioning motor such as a voice coil motor.

A suspension is mounted on the actuator arm. The suspension comprises a load beam, and a flexure disposed to overlap the load beam. A slider, which constitutes a magnetic head, is mounted on a tongue of a gimbal portion formed near a distal end of the flexure. The slider is provided with elements (transducers) for accessing data, that is, for reading or writing data. A conducting member is connected to the slider. The load beam, the flexure, the slider, the conducting member, etc., constitute a head gimbal assembly.

As disclosed in U.S. Pat. No. 6,965,499 (Patent Document 1) and U.S. Pat. No. 8,000,061 (Patent Document 2), a head gimbal assembly comprising an outrigger portion comprising a pair of arms in the exterior of a tongue is known. In this type of head gimbal assembly, a conducting member may be arranged in the interior of the outrigger portion, that is, between the arm and the tongue.

In order to deal with increased recording density of disks, the magnetic head needs to be more precisely positioned relative to the recording surface of the disk. In order to achieve this, dual-stage-actuator (DSA) suspensions, which use both positioning motors (voice coil motors) and microactuator elements made of a piezoelectric material such as lead zirconate titanate (PZT), have been developed. Further, as disclosed in Jpn. Pat. Appln. KOKAI Publication No. 2010-146631 (Patent Document 3) and Jpn. Pat. Appln. KOKAI Publication No. 2010-218626 (Patent Document 4), a DSA suspension with microactuator elements mounted on a gimbal portion of a flexure is known.

A slider mounted on a tongue of a head gimbal assembly needs to be maintained at a predetermined position (attitude) with respect to the recording surface of a disk. Accordingly, the pitch stiffness and the roll stiffness of the tongue must be appropriate. As disclosed in Patent Documents 1 and 2, in the case where the conducting member is arranged in the interior of the outrigger portion, movement of the tongue is susceptible to rigidity of the conducting member. For example, when the bending stiffness of the conducting member is high, the pitch stiffness and the roll stiffness of the tongue tend to be high.

Hence, a countermeasure that has been conceived was reducing the bending stiffness of the conducting member by forming a bendable portion in a portion of the conducting member. However, the conducting member comprising the bendable portion has a problem that it is easily vibrated since the stiffness is low. In particular, in the DSA suspension including the microactuator elements mounted on the gimbal portion as those described in Patent Documents 3 and 4, a problem arose that the tongue and the conducting member are easily vibrated when the microactuator elements are actuated.

If the conducting member is fixed to a protrusion formed in a portion of the outrigger portion, as described in Patent Document 2, for example, it may be possible to reduce vibration of the conducting member. However, if the bendable portion of the conducting member is fixed to the outrigger portion, coupling of a mode of vibration of the outrigger portion and a mode of vibration of the conducting member amplifies the vibration, which may generate large vibration in the gimbal portion.

BRIEF SUMMARY OF THE INVENTION

Accordingly, an object of the present invention is to provide a disk drive suspension which can prevent vibration of a gimbal portion and a conducting member.

In one embodiment, a disk drive suspension comprises: a load beam; a flexure with a metal base supported by the load beam, which comprises a tongue on which a slider is mounted and a pair of arms formed on both sides of the tongue; and a conducting member connected to the slider, wherein the conducting member includes an insulating layer made of electrically insulating resin and conductors formed on the insulating layer, and comprises unsupported conductive circuit portions which do not overlap with the metal base, and bridge members to mutually connect the unsupported conductive circuit portions and the tongue between the unsupported conductive circuit portions and the tongue.

According to the structure of this embodiment, not only can vibration of bendable portions, etc., of the unsupported conductive circuit portions of the conductive member be reduced by the bridge members, but also the yaw stiffness of the tongue of a gimbal portion can be improved. Further, vibration characteristics of the gimbal portion can be improved, such as preventing amplification of the vibration caused by coupling of the arms which constitute an outrigger portion and the unsupported conductive circuit portions.

In the suspension of the above embodiment, the bridge members are formed of resin, which is the same material as the insulating layer. Further, the unsupported conductive circuit portions may comprise curved bendable portions which protrude toward the arms, respectively, and the bridge members may be connected to the bendable portions, respectively. As an example, the bridge members comprise bridge bodies along the arms, one-side end portions extending from one ends of the bridge bodies to the tongue, respectively, and other-side end portions extending from other ends of the bridge bodies to the unsupported conductive circuit portions, respectively. Each of opening portions may be formed between the corresponding bridge body and the corresponding unsupported conductive circuit portion.

Further, the suspension of the embodiment may comprise a pair of microactuator elements disposed on the tongue, wherein the tongue may comprise a pair of supporting portions to which end portions of the microactuator elements are secured, respectively, and the bridge members may be connected to the supporting portions, respectively. An example of the tongue comprises a first tongue portion on which a leading-side portion of the slider is disposed, a second tongue portion on which a trailing-side portion of the slider is disposed, and a hinge portion formed between the first tongue portion and the second tongue portion. The hinge portion is narrower than the first and second tongue portions, and pivotably connects the first tongue portion and the second tongue portion. Each of limiter members formed of resin, which is the same material as the bridge members, may be arranged between the second tongue portion and a stationary part of the flexure.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A disk drive suspension according to one embodiment of the present invention will now be described with reference to FIGS. 1 to 14.

Figure 1:
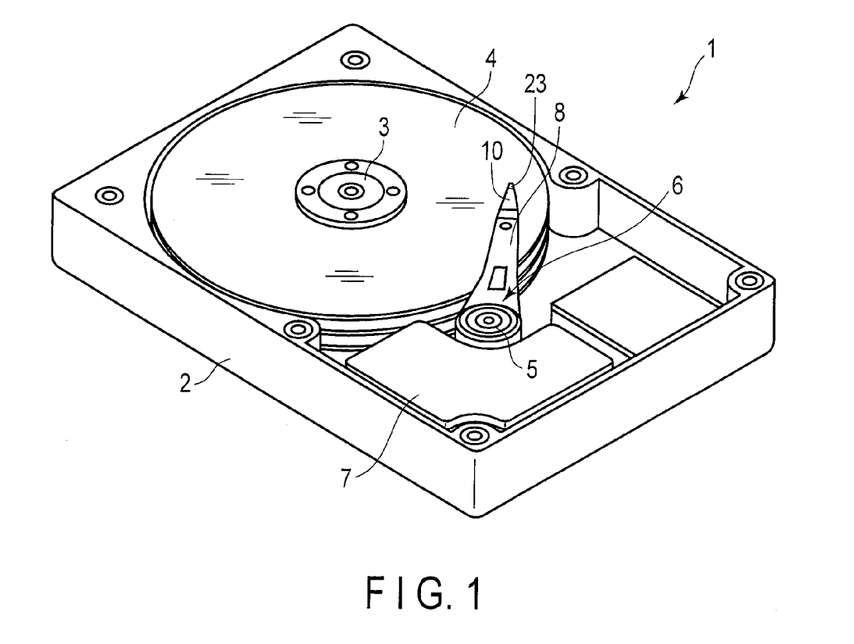
FIG. 1 is a perspective view showing an example of a disk drive.

A disk drive (HDD) 1 shown in FIG. 1 comprises a case 2, disks 4 rotatable about a spindle 3, a carriage 6 turnable about a pivot 5, a positioning motor (voice coil motor) 7 for actuating the carriage 6, etc. The case 2 is sealed by a lid which is not shown.

Figure 2:
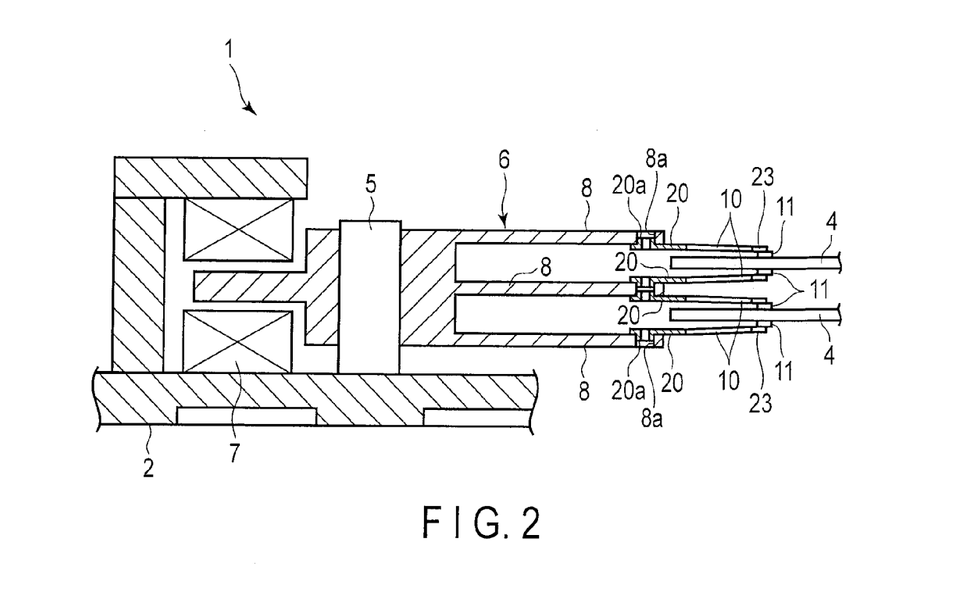
FIG. 2 is a partial cross-sectional view of the disk drive shown in FIG. 1.

FIG. 2 is a cross-sectional view schematically showing a part of the disk drive 1. As shown in FIGS. 1 and 2, the carriage 6 is provided with arms (carriage arms) 8. At a distal end portion of each arm 8, a suspension 10 is mounted. A slider 11 which constitutes a magnetic head is provided at a distal end portion of the suspension 10. When each disk 4 rotates at high speed, an air bearing is formed between the disk 4 and the slider 11 as air flows in between the disk 4 and the slider 11.

If the carriage 6 is turned by the positioning motor 7, the suspension 10 moves radially relative to the disk 4, and the slider 11 thereby moves to a desired track of the disk 4.

Figure 3:
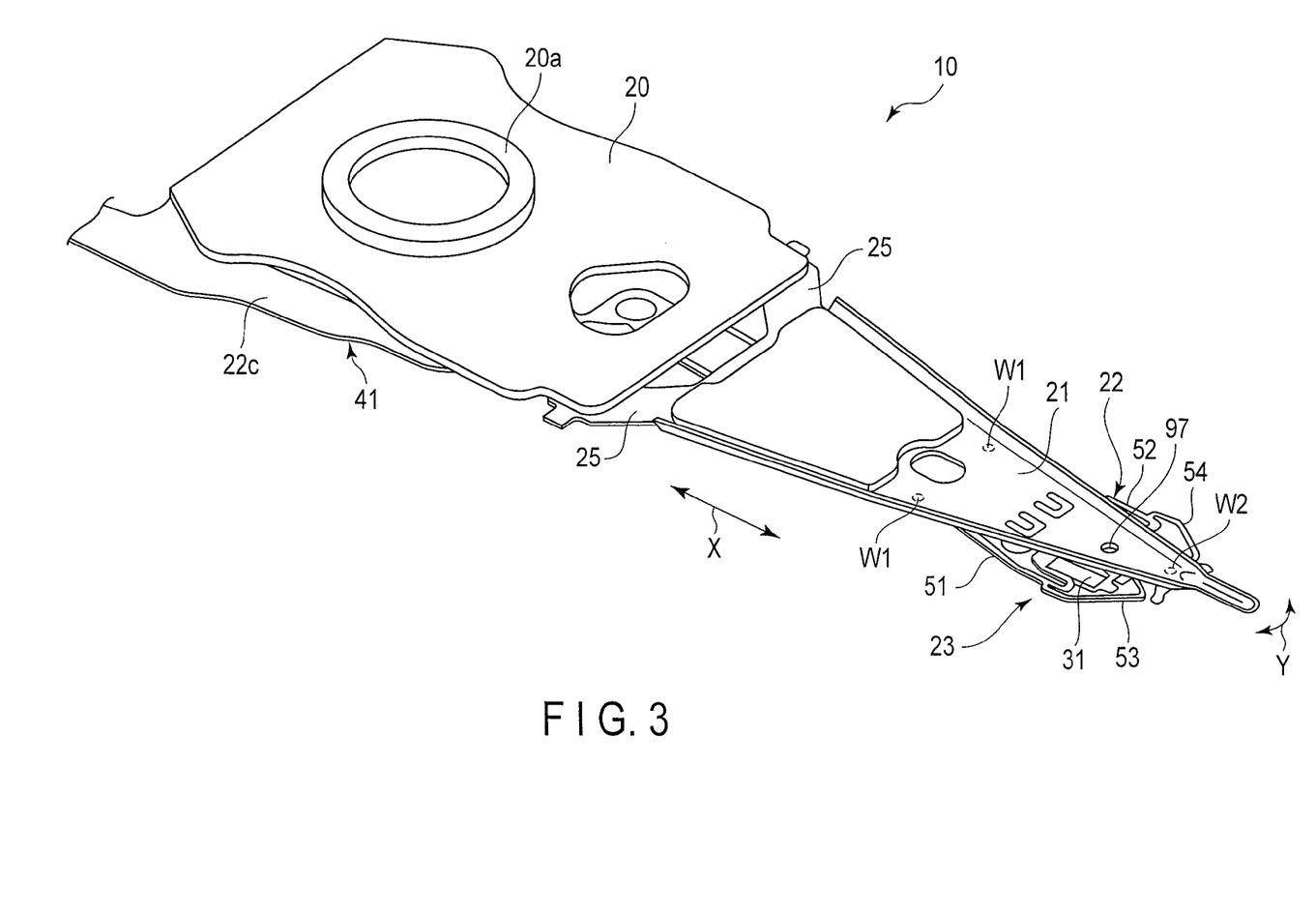
FIG. 3 is a perspective view of a disk drive suspension of an embodiment.

FIG. 3 shows the suspension 10 of the dual-stage-actuator (DSA) type. The suspension 10 comprises a baseplate 20 secured to its corresponding arm 8 (FIGS. 1 and 2) of the carriage 6, a load beam 21, a flexure 22 with conductors, and a microactuator mounting section 23 arranged near a distal end of the suspension 10. A boss portion 20a is formed on the baseplate 20. The boss portion 20a is inserted into a hole 8a (FIG. 2) formed in each arm 8.

The direction indicated by arrow X in FIG. 3 is the longitudinal direction of the load beam 21, that is, the longitudinal direction (front-rear direction) of the suspension 10. Arrow Y indicates the sway direction (i.e., the lateral direction of the slider 11). Spring portions 25 which can perform thicknesswise elastic deformation are formed on a proximal portion (rear end portion) of the load beam 21. The flexure 22 is arranged along the load beam 21.

Figure 4:
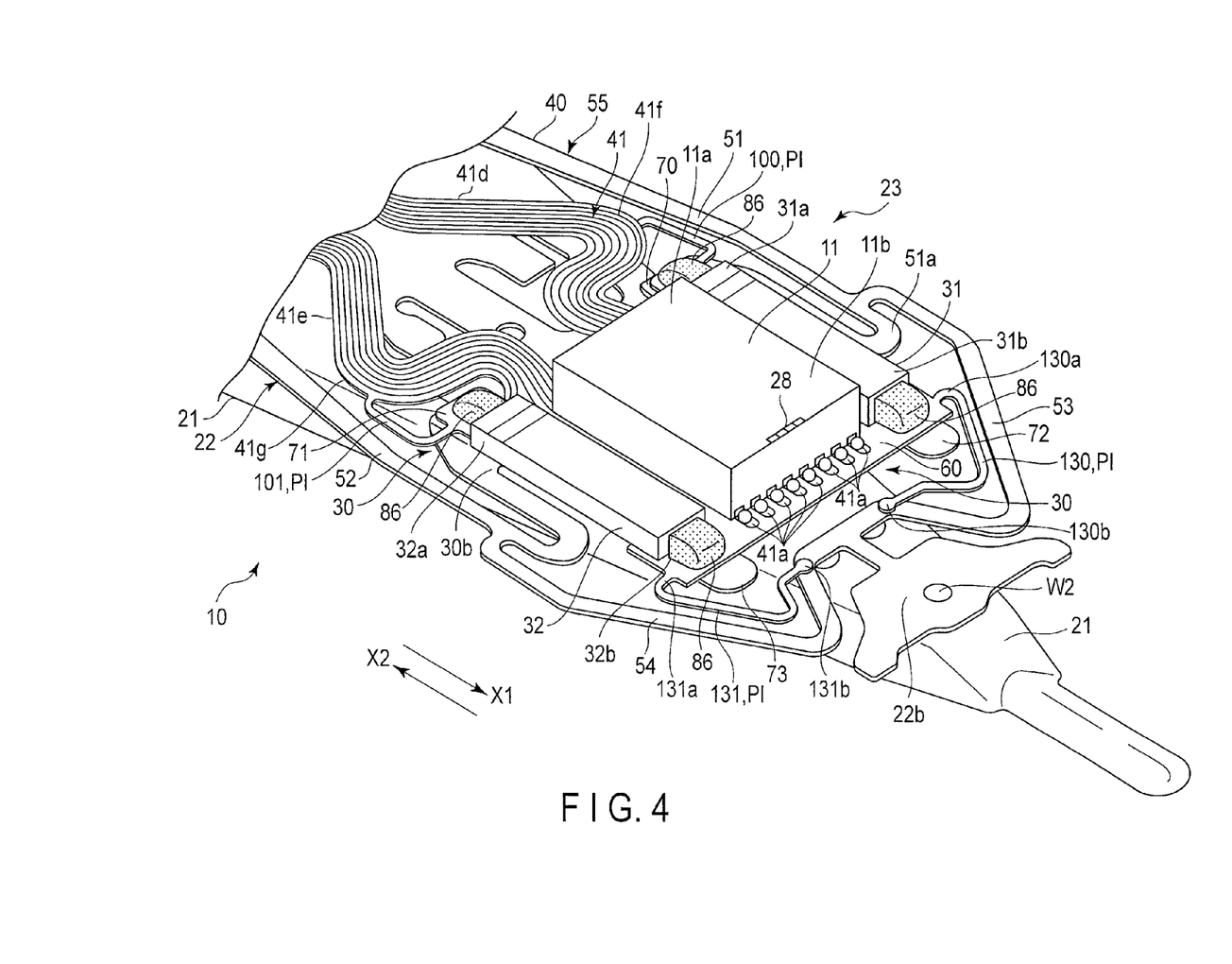
FIG. 4 is a perspective view of a microactuator mounting section of the suspension shown in FIG. 3.

FIG. 4 is a perspective view of the microactuator mounting section 23 arranged at the distal end portion of the suspension 10 as seen from the side of the slider 11. At an end portion of the slider 11 which constitutes the magnetic head, elements 28, such as magnetoresistive (MR) elements, capable of performing conversion between magnetic and electronic signals are provided. By these elements 28, access such as writing or reading of data on and from the disk 4 is performed. The slider 11, the load beam 21, the flexure 22, and the like constitute a head gimbal assembly.

The microactuator mounting section 23 includes a gimbal portion 30 formed at a distal end portion of the flexure 22, and a pair of microactuator elements 31 and 32 disposed individually on the opposite sides of the slider 11. The microactuator elements 31 and 32 have the function of minutely pivoting the slider 11 in the sway direction.

Figure 5:
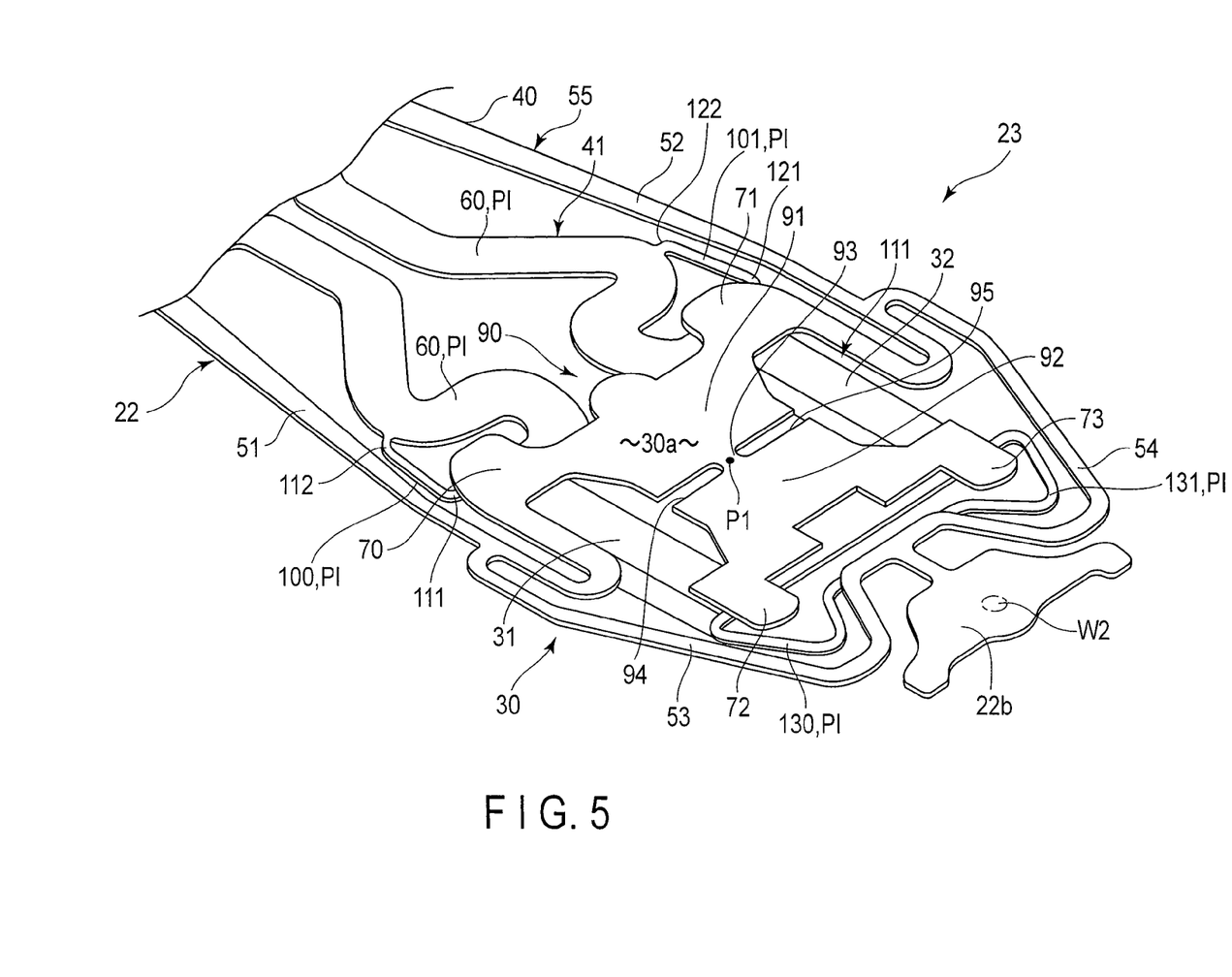
FIG. 5 is a perspective view of the microactuator mounting section shown in FIG. 4 as seen from the side opposite to FIG. 4.
Figure 6:
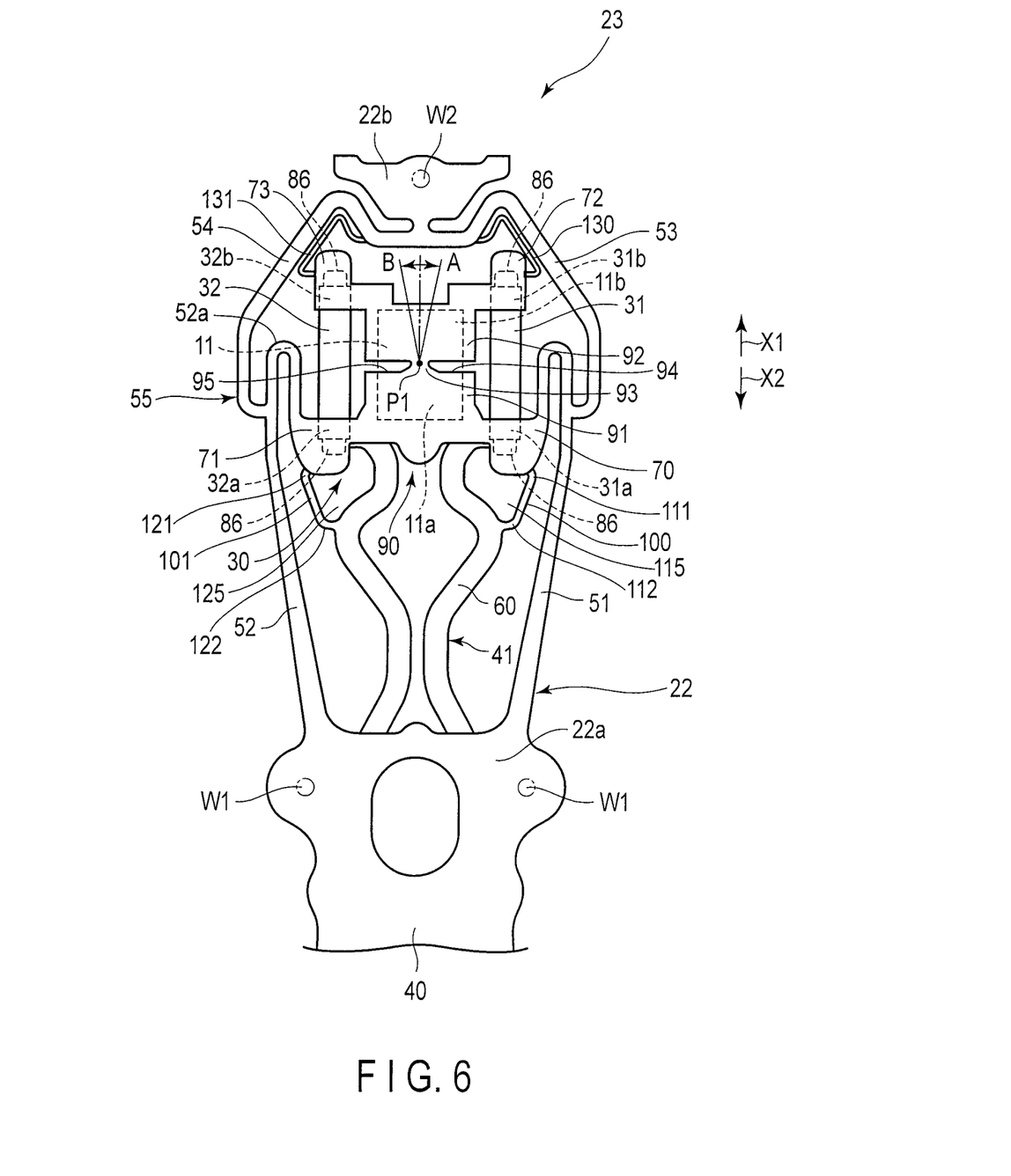
FIG. 6 is a plan view of the microactuator mounting section shown in FIG. 5.
Figure 7:
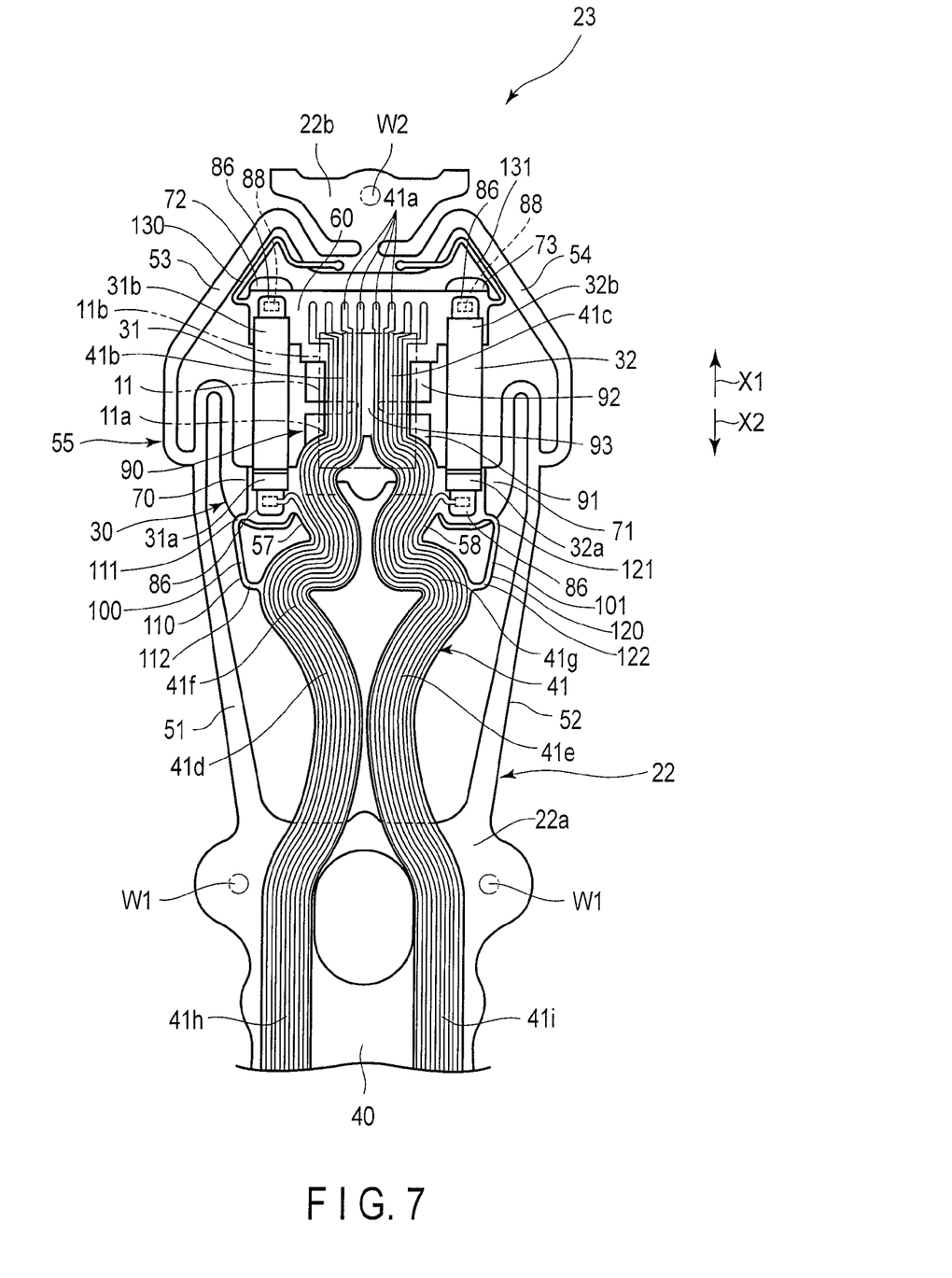
FIG. 7 is a bottom view of the microactuator mounting section shown in FIG. 5 as seen from the side opposite to FIG. 5.
Figure 8:
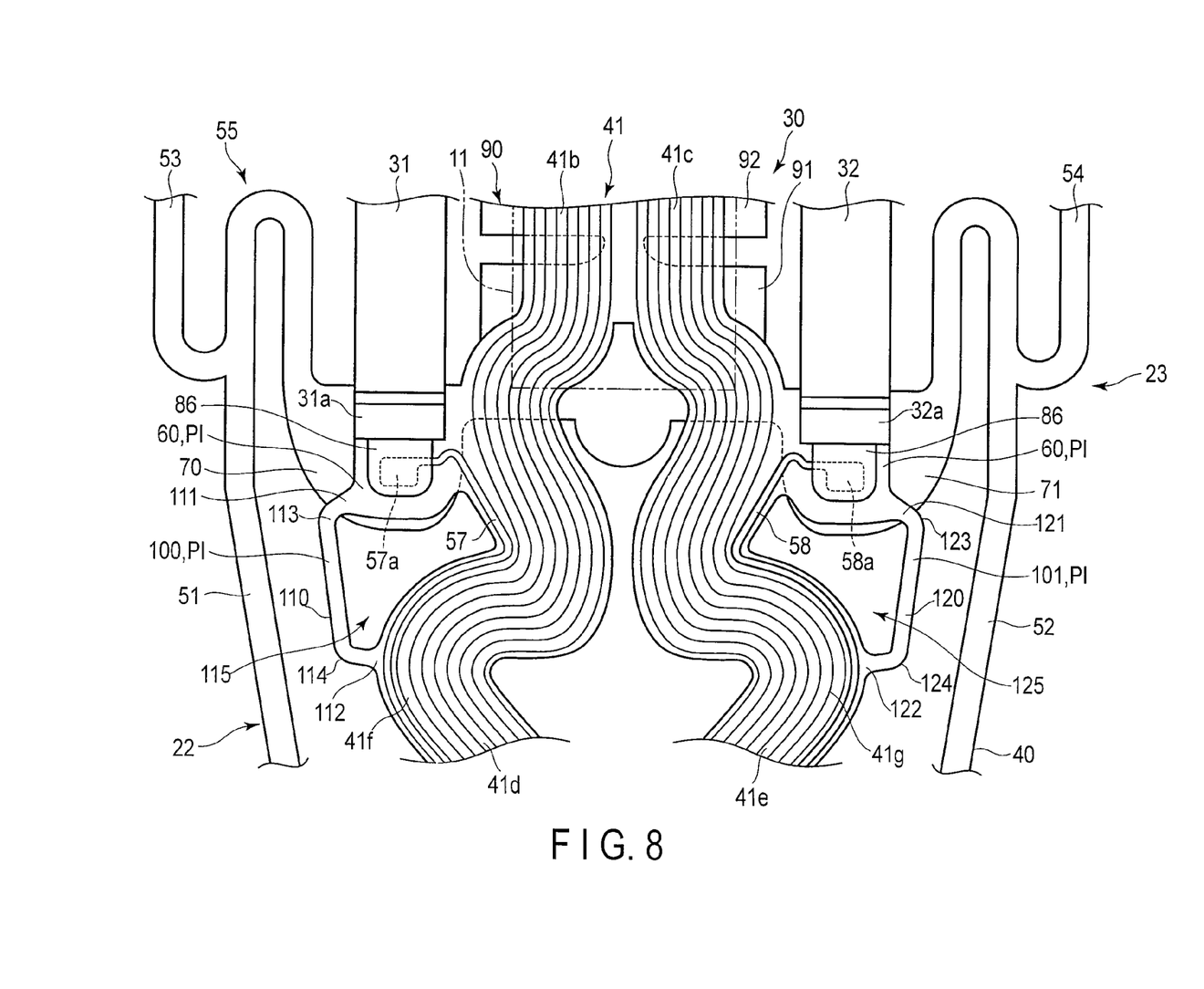
FIG. 8 is a partial enlarged view of the microactuator mounting section shown in FIG. 7.

FIG. 5 is a perspective view of the microactuator mounting section 23 as seen from the side opposite to FIG. 4. FIG. 6 is a plan view of the microactuator mounting section 23. FIG. 7 is a bottom view of the microactuator mounting section 23 as seen from the side opposite to FIG. 6. FIG. 8 is an enlarged view of a part of FIG. 7.

Figure 11:
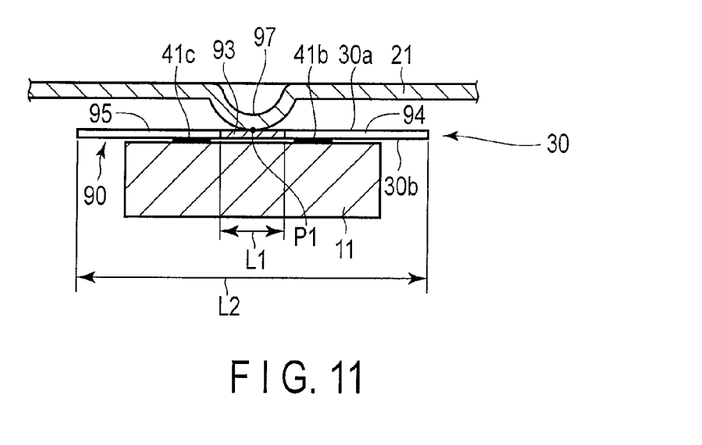
FIG. 11 is a cross-sectional view showing a part of a load beam and a gimbal portion.

The gimbal portion 30 includes a first surface 30a (FIGS. 5 and 11) and a second surface 30b (FIGS. 4 and 11). The first surface 30a is opposed to the load beam 21. The second surface 30b is on the opposite side of the first surface 30a. The slider 11 and the microactuator elements 31 and 32 are disposed on the second surface 30b.

The flexure 22 comprises a metal base 40 and a conducting member 41. The metal base 40 is formed of a thin stainless-steel plate. The conducting member 41 is disposed along the metal base 40. The metal base 40 is, for example, 20 μm (12 to 25 μm) in thickness. The metal base 40 is secured to the load beam 21 by fixing means such as first weld W1 (FIGS. 3 and 6, etc.) and second weld W2 (FIGS. 3 to 7). Welds W1 and W2 are formed by laser welding, for example. The flexure 22 includes a first stationary part 22a and a second stationary part 22b. The first stationary part 22a is secured to the load beam 21 by weld W1 at an intermediate portion in the front-rear direction of the suspension 10. The second stationary part 22b is secured to the load beam 21 by weld W2 at a position close to a distal end of the flexure 22. A rear portion 22c (FIG. 3) of the flexure 22 extends rearward from a front end of the baseplate 20.

As shown in FIGS. 5 to 7, the metal base 40 comprises first arms (first outriggers) 51 and 52, and second arms (second outriggers) 53 and 54. The first arms 51 and 52 are contiguous to the first stationary part 22a. The second arms 53 and 54 are contiguous to the second stationary part 22b. The first arms 51 and 52 and the second arms 53 and 54 constitute an outrigger portion 55 for elastically supporting the slider 11.

As shown in FIG. 8, conductors 57 and 58 for the microactuator elements 31 and 32 are provided on both sides of the conducting member 41, respectively. Terminals 57a and 58a are provided at distal ends of the conductors 57 and 58, respectively, and the terminals 57a and 58a are electrically connected to the microactuator elements 31 and 32, respectively.

Figure 9:
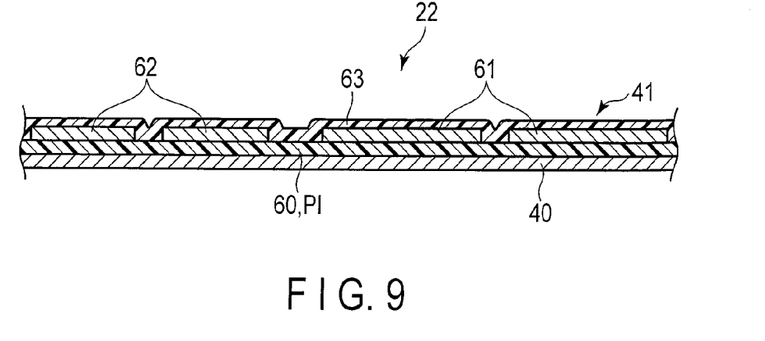
FIG. 9 is a partial cross-sectional view of a conducting member of the suspension.

FIG. 9 shows an example of cross-sections of the metal base 40 and the conducting member 41. The conducting member 41 comprises an insulating layer 60, write conductors 61, read conductors 62, and a cover layer 63. The insulating layer 60 is made of electrically insulating resin PI, such as polyimide. The conductors 61 and 62 are formed on the insulating layer 60. The cover layer 63 is made of an electrically insulating resin, such as polyimide. The cover layer 63 is omitted in the conducting member 41 shown in FIGS. 7 and 8.

The write conductors 61 and the read conductors 62 are connected to the elements 28 (FIG. 4) of the slider 11. For example, the insulating layer 60 is 10 μm (5 to 20 μm) thick, the conductors 61 and 62, 9 μm (4 to 15 μm) thick; and the cover layer 63, 5 μm (2 to 10 μm) thick. The thickness of the metal base 40 is, for example, 12 to 25 μm, which is less than that (for example, 30 μm) of the load beam 21.

The microactuator element 31 comprises first end portions 31a and second end portions 31b, and the microactuator element 32 comprises first end portion 32a and second end portions 32b. Arrow X1 shown in FIGS. 4, 6 and 7 indicates the forward direction of the elements 31 and 32, and arrow X2 indicates the rearward direction of the same. The first end portions 31a and 32a of the elements 31 and 32 are secured to a pair of first supporting portions 70 and 71, which constitute a part of the gimbal portion 30, respectively. The second end portions 31b and 32b of the elements 31 and 32 are secured to a pair of second supporting portions 72 and 73, which constitute a part of the gimbal portion 30, respectively.

The first supporting portions 70 and 71 are supported by the stationary parts 22a and 22b of the flexure 22 (i.e., the parts secured to the load beam 21) via the first arms 51 and 52 and the second arms 53 and 54. The second supporting portions 72 and 73 are formed at a distal end of the gimbal portion 30.

Figure 10:
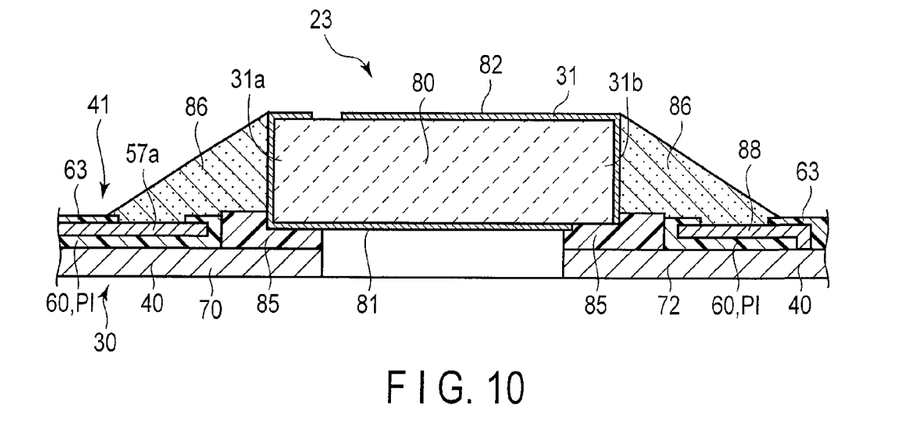
FIG. 10 is a partial cross-sectional view of the microactuator mounting section shown in FIG. 4.

FIG. 10 shows a cross-section of a joint portion. The joint portion serves to perform mechanical fixing and electrical connection of the end portions 31a and 31b of one of the microactuator elements, i.e., the microactuator element 31. Since the joint portion between the end portions 32a and 32b of the other microactuator element 32 has a similar structure as the one shown in FIG. 10, the microactuator element 31 will be described as a typical example of the microactuator element.

As shown in FIG. 10, the microactuator element 31 comprises a PZT 80, and a first electrode 81 and a second electrode 82 formed on a peripheral surface of the PZT 80. The first electrode 81 is formed extending from one end surface of the PZT 80 to a lower surface thereof. The second electrode 82 is formed extending from the other end surface of the PZT 80 to an upper surface thereof. The first end portion 31a is secured to the first supporting portion 70 by means of an electrically insulating adhesive 85. The second end portion 31b is secured to the second supporting portion 72 by means of the electrically insulating adhesive 85.

The first electrode 81 shown in FIG. 10 is electrically connected to the terminal 57a of the conductor 57 for the microactuator element 31 via an electrically conductive adhesive (for example, silver paste) 86 provided over the supporting portion 70. The second electrode 82 is electrically connected to a conductor 88 on the ground side via the electrically conductive adhesive (for example, silver paste) 86 provided over the supporting portion 72. The conductor 88 on the ground side is electrically connected to the metal base 40.

As shown in FIGS. 5 and 6, etc., the gimbal portion 30 comprises a first tongue portion 91 on a stationary side, a movable second tongue portion 92, and a hinge portion 93 formed between the tongue portions 91 and 92. The first tongue portion 91 is formed between the first supporting portions 70 and 71. The second tongue portion 92 is formed between the second supporting portions 72 and 73. Terminals 41a (FIGS. 4 and 7) for the slider 11 are formed on the second tongue portion 92. The terminals 41a have electrical conduction with the conductors (for example, the conductors 61 and 62) of the conducting member 41.

The hinge portion 93 is formed between the first tongue portion 91 and the second tongue portion 92. The supporting portions 70, 71, 72, and 73, the tongue portions 91 and 92, and the hinge portion 93 all constitute a part of the metal base 40, and their respective contours are formed by, for example, etching. The first tongue portion 91, the second tongue portion 92, and the hinge portion 93 constitute a tongue 90 configured to mount the slider 11 thereon.

Figure 12:
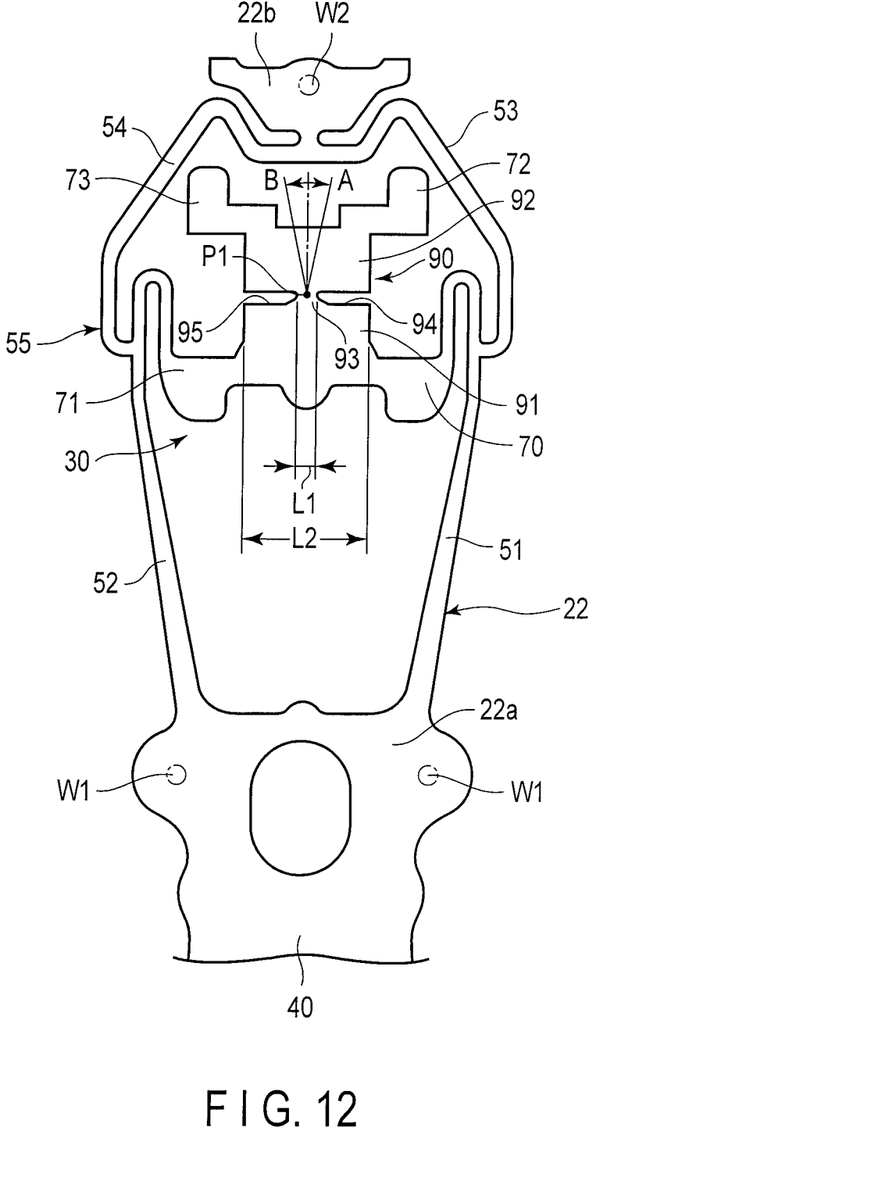
FIG. 12 is a plan view of a flexure of the microactuator mounting section shown in FIG. 5.

FIG. 11 is a partial cross-sectional view of the load beam 21 and the gimbal portion 30 taken at the hinge portion 93. FIG. 12 is a plan view showing the gimbal portion 30. Width L1 of the hinge portion 93 is sufficiently less than width L2 of each of the first and second tongue portions 91 and 92. The first tongue portion 91 and the second tongue portion 92 are relatively pivotably connected together by the hinge portion 93. On both sides of the hinge portion 93, slits 94 and 95 are formed, respectively. The movable second tongue portion 92 can be moved relative to the first tongue portion 91 on the stationary side in the directions indicated by arrows A and B in FIG. 12.

A leading-side portion 11a of the slider 11 is disposed on the first tongue portion 91. The leading-side portion 11a is disposed to be movable relative to the first tongue portion 91. A trailing-side portion 11b is disposed on the second tongue portion 92. The trailing-side portion 11b is secured to the second tongue portion 92. The "leading-side" mentioned here is the side where air flows in between the slider 11 and the disk 4 as the disk 4 rotates. In contrast, the "trailing-side" is the side where the air entered between the slider 11 and the disk 4 comes out. The hinge portion 93 is formed at the center of the slider 11, for example, the center of gravity of the slider 11 or the center of the slider 11 with respect to both the transverse and longitudinal directions.

A dimple 97 (FIG. 11) is formed near a distal end of the load beam 21. The dimple 97 is an example of a supporting protrusion, and has a convex surface projecting toward the gimbal portion 30 of the flexure 22. The top part of the convex surface (the distal end of the dimple 97) contacts the hinge portion 93. The gimbal portion 30 is supported for swinging motion relative to the load beam 21 about a point of contact P1 between the distal end of the dimple 97 and the hinge portion 93.

Alternatively, a dimple may be formed on the hinge portion 93 such that the distal end of the dimple contacts the load beam 21. That is, what is required for the supporting protrusion such as the dimple is that the supporting protrusion should be formed on one of the mutually facing surfaces of the load beam 21 and the hinge portion 93, and that the distal end of the supporting protrusion should contact the other surface.

The conducting member 41 comprises a pair of tongue conductive circuit portions 41b and 41c, a pair of unsupported conductive circuit portions 41d and 41e, and portions 41h and 41i (FIG. 7) which overlap with the metal base 40. The tongue conductive circuit portions 41b and 41c are separated as right and left portions on the tongue 90. The unsupported conductive circuit portions 41d and 41e extend rearward relative to the tongue conductive circuit portions 41b and 41c, respectively. The portions 41h and 41i which overlap with the metal base 40 extend rearward relative to the unsupported conductive circuit portions 41d and 41e, respectively. Of the entire conducting member 41, the tongue conductive circuit portions 41b and 41c are the portions which overlap with the metal base 40. Each of the tongue conductive circuit portions 41b and 41c is secured to the first tongue portion 91 and the second tongue portion 92 between the elements 31 and 32. Of the entire conducting member 41, the unsupported conductive circuit portions 41d and 41e are portions which do not overlap with the metal base 40.

The unsupported conductive circuit portions 41d and 41e include bendable portions 41f and 41g, respectively. The bendable portions 41f and 41g are formed longitudinally in a portion of the conducting member 41. The bendable portions 41f and 41g protrude toward the first arms 51 and 52, respectively. Each of the bendable portions 41f and 41g has a curved configuration and is disposed between the first arms 51 and 52. By providing the bendable portions 41f and 41g in the unsupported conductive circuit portions 41d and 41e, the bending stiffness of the unsupported conductive circuit portions 41d and 41e can be further reduced.

FIG. 8 shows a part of the microactuator mounting section 23 of FIG. 7 in an enlarged scale. The microactuator mounting section 23 of the present embodiment comprises bridge members 100 and 101. By the bridge members 100 and 101, the unsupported conductive circuit portions 41d and 41e of the conducting member 41 are connected to the first supporting portions 70 and 71, respectively.

The bridge members 100 and 101 are formed of resin PI (for example, polyimide), which is the same material as the insulating layer 60 (FIGS. 9 and 10) of the conducting member 41. The bridge members 100 and 101 are formed into a predetermined shape by being etched together with the insulating layer 60 as the insulating layer 60 is formed. Alternatively, the bridge members 100 and 101 of a predetermined shape may be formed by, for example, applying resin PI over a masked metal base.

The first bridge member 100 located on the left side in FIGS. 7 and 8 comprises a bridge body 110, an end portion 111 on one end, and an end portion 112 on the other end. The bridge body 110 extends in a longitudinal direction of the unsupported conductive circuit portion 41d along the arm 51. As shown in FIG. 8, etc., the end portion 111 comprises a curved portion 113. The curved portion 113 is curved toward the supporting portion 70 on the left side from the bridge body 110. The curved portion 113 is connected to the insulating layer 60 on the supporting portion 70. The end portion 112 on the other end also comprises a curved portion 114. The curved portion 114 is curved toward the unsupported conductive circuit portion 41d from the bridge body 110. The curved portion 114 is connected to the insulating layer 60 in the exterior of the curve of the bendable portion 41f.

The first bridge member 100 serves to connect the bendable portion 41f of the unsupported conductive circuit portion 41d and the supporting portion 70 to each other. A first opening portion 115 is formed between the first bridge member 100 and the unsupported conductive circuit portion 41d. It should be noted that the specific forms of the bridge body 110 and the curved portions 113 and 114 are not limited to those described in this embodiment, and various forms can be adopted.

The second bridge member 101 located on the right side in FIGS. 7 and 8 comprises a bridge body 120, an end portion 121 on one end, and an end portion 122 on the other end. The bridge body 120 extends in a longitudinal direction of the unsupported conductive circuit portion 41e along the arm 52. The end portion 121 comprises a curved portion 123. The curved portion 123 is curved toward the supporting portion 71 on the right side from the bridge body 120. The curved portion 123 is connected to the insulating layer 60 on the supporting portion 71. Also, the end portion 122 on the other end comprises a curved portion 124. The curved portion 124 is curved toward the unsupported conductive circuit portion 41e from the bridge body 120. The curved portion 124 is connected to the insulating layer 60 in the exterior of the curve of the bendable portion 41g.

The second bridge member 101 serves to connect the bendable portion 41g of the unsupported conductive circuit portion 41e and the supporting portion 71 to each other. A second opening portion 125 is formed between the second bridge member 101 and the unsupported conductive circuit portion 41e. It should be noted that the specific forms of the bridge body 120 and the curved portions 123 and 124 are not limited to those described in this embodiment, and various forms can be adopted.

The microactuator mounting section 23 of the present embodiment comprises limiter members 130 and 131. The limiter members 130 and 131 serve to prevent the tongue 90 from excessively vibrating or the dimple 97 from moving away from the tongue 90 (dimple separation) when the suspension 10 is subjected to external mechanical shock. The limiter members 130 and 131 are formed of resin PI (for example, polyimide), which is the same material as the insulating layer 60 of the conducting member 41, as in the bridge members 100 and 101. As shown in FIG. 4, etc., ends 130a and 131a of the limiter members 130 and 131 are connected to places near the supporting portions 72 and 73, respectively. The other ends 130b and 131b of the limiter members 130 and 131 are connected to places near the stationary part 22b of the flexure 22.

An operation of the suspension 10 of the present embodiment will now be described.

If the carriage 6 (FIGS. 1 and 2) is turned by the positioning motor 7, the suspension 10 moves radially relative to the disk 4, and the slider 11 of the magnetic head thereby moves to a desired track of the recording surface of the disk 4. When a voltage is applied to the microactuator elements 31 and 32, the microactuator elements 31 and 32 are distorted in directions opposite to each other according to the voltage. Consequently, the load beam 21 can be moved in the sway direction (indicated by arrow Y in FIG. 3) by an infinitesimal distance. That is, when the microactuator elements 31 and 32 are driven by the voltage, the movable second tongue portion 92 pivots about the hinge portion 93 with respect to the first tongue portion 91 on the stationary side.

Figure 13:
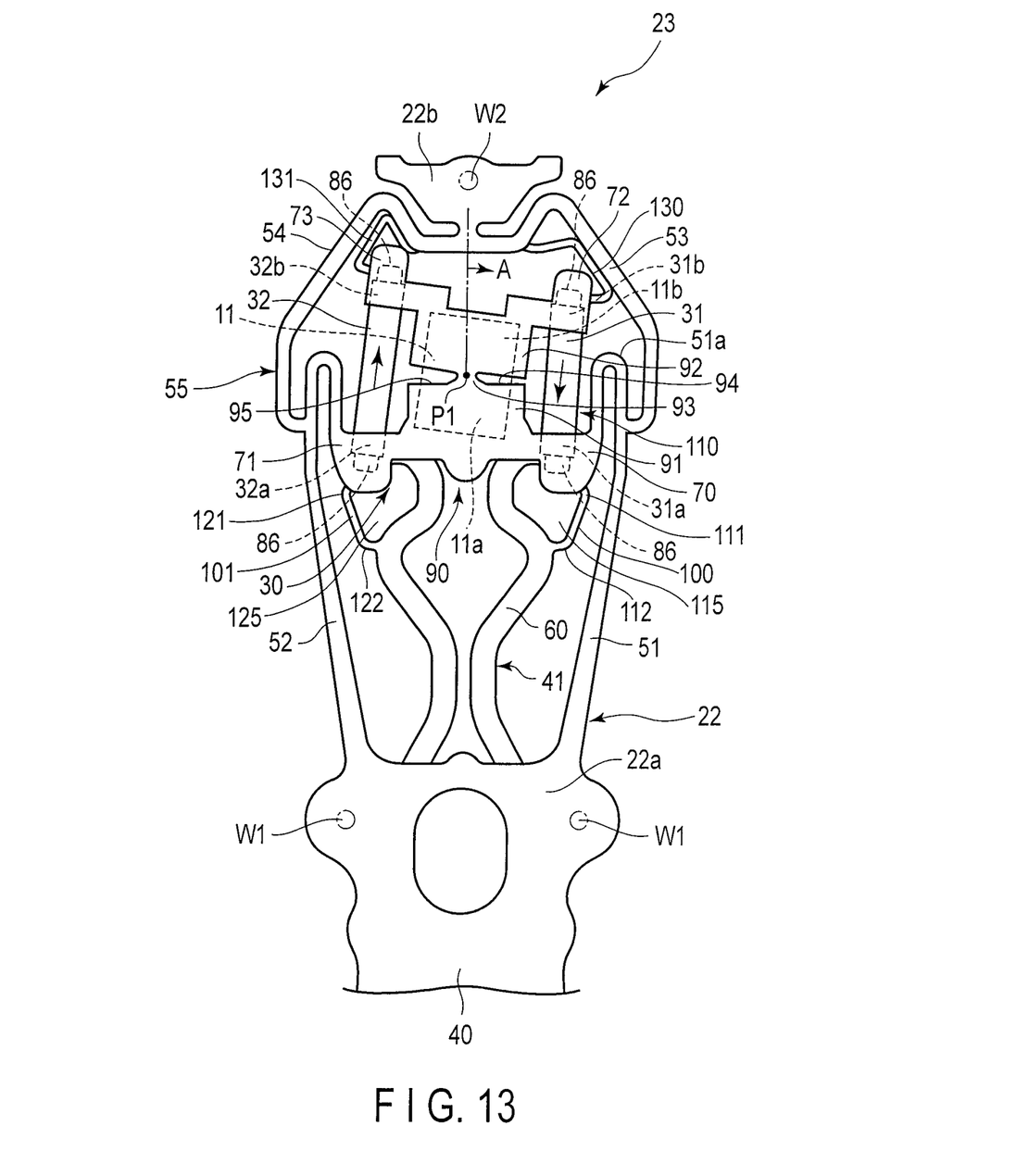
FIG. 13 is a plan view schematically showing the microactuator mounting section with microactuator elements actuated.

As schematically illustrated in FIG. 13, for example, the second tongue portion 92 moves in the direction indicated by arrow A as one of the microactuator elements, that is, the microactuator element 31 contracts, and the other microactuator element 32 extends. Accordingly, the elements 28 (FIG. 4) provided on the slider 11 can be positioned speedily and with high precision in the sway direction. Actually, the movement distance of the slider 11 in the sway direction ranges from several nm to several tens of nm or so. However, the degree of deformation of the gimbal portion 30 is exaggeratedly depicted in FIG. 13 for better understanding of the movements of the slider 11 and the second tongue portion 92.

The tongue conductive circuit portions 41*b* and 41*c* pass near contact point P1 of the hinge portion 93 where movement is little when the elements 31 and 32 are driven. The back parts of the tongue conductive circuit portions 41*b* and 41*c* continue to the unsupported conductive circuit portions 41*d* and 41*e* comprising the bendable portions 41*f* and 41*g*. The bendable portions 41*f* and 41*g* of the unsupported conductive circuit portions 41*d* and 41*e* are connected to the supporting portions 70 and 71 of the first tongue portion 91 via the bridge members 100 and 101, respectively. Further, the opening portions 115 and 125 are formed between the bridge member 100 and the unsupported conductive circuit portion 41*d*, and between the bridge member 101 and the unsupported conductive circuit portion 41*e*.

The conducting member 41 of the present embodiment comprises the unsupported conductive circuit portions 41*d* and 41*e* arranged in the interior of the arms 51 and 52, and the unsupported conductive circuit portions 41*d* and 41*e* are provided with the bendable portions 41*f* and 41*g*, respectively. Consequently, the bending stiffness of the unsupported conductive circuit portions 41*d* and 41*e* can be reduced, and the roll stiffness and the pitch stiffness of the tongue 90 can also be reduced.

Also, the bendable portions 41*f* and 41*g* of the unsupported conductive circuit portions 41*d* and 41*e* are connected to the tongue 90 by the bridge members 100 and 101. Accordingly, vibration of the bendable portions 41*f* and 41*g* and the tongue 90 are suppressed, and the yaw stiffness of the tongue 90 (i.e., stiffness around contact point P1 between the hinge portion 93 and the dimple 97) is also improved. Thus, the conducting member 41 can be prevented from flapping while the elements 31 and 32 are driven. The bendable portions 41*f* and 41*g* are not connected to the arms 51 and 52 of the outrigger portion 55. For this reason, the disk drive suspension of the present embodiment has an advantage that it does not produce amplification of vibration caused by coupling of the outrigger portion 55 and the unsupported conductive circuit portions 41*d* and 41*e*.

Figure 14:
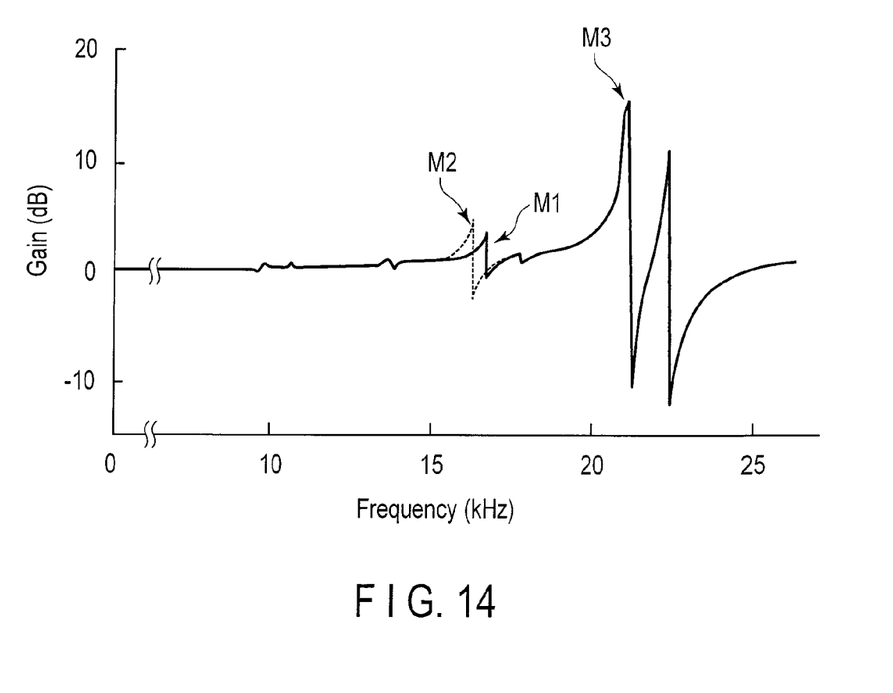
FIG. 14 is a view showing vibration characteristics of the microactuator mounting section.

A solid line in FIG. 14 indicates vibration characteristics of the microactuator mounting section 23 including the bridge members 100 and 101 in the sway direction. Resonance mode M1 having a small amplitude (low gain) appears around 17 kHz in the microactuator mounting section 23 provided with the bridge members 100 and 101. However, since this resonance mode M1 is away from resonance mode M3 of the outrigger portion, amplification of vibration caused by coupling with the outrigger portion is avoided.

In contrast, a broken line in FIG. 14 indicates vibration characteristics of a microactuator mounting section of a comparative example which does not include the bridge members 100 and 101. In the comparative example, resonance mode M2 having a large amplitude (high gain) appears around 16 kHz, which is lower than the frequency of the microactuator mounting section 23 including the bridge members 100 and 101. Accordingly, in the microactuator mounting section of the comparative example, resonance easily occurs by coupling in a relatively low frequency range.

Needless to say, in carrying out the present invention, the specific forms of the tongue, outrigger portion, etc., of the flexure which constitute the head gimbal assembly, as well as the specific forms such as the shapes and arrangement of the bridge member and the conducting member, may be modified variously. Further, the bridge member of the present invention can also be applied to a gimbal portion of a suspension which does not comprise microactuator elements.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive suspension comprising:
   a load beam;
   a flexure with a metal base supported by the load beam, the flexure comprising a tongue on which a slider is mounted, and a pair of arms formed on both sides of the tongue; and
   a conducting member connected to the slider,
   wherein the conducting member includes an insulating layer made of an electrically insulating resin and conductors formed on the insulating layer, and the conducting member comprises unsupported conductive circuit portions which do not overlap with the metal base and which comprise curved bendable portions that protrude toward the pair of arms, respectively,
   wherein the tongue comprises a pair of supporting portions to which end portions of a pair of microactuator elements are secured, respectively,
   wherein the conducting member further comprises bridge members to mutually connect the unsupported conductive circuit portions and the tongue between the unsupported conductive circuit portions and the tongue, and
   wherein the bridge members are formed of a resin which is the same material as the electrically insulating resin of the insulating layer, and the bridge members comprise:
      bridge bodies along the pair of arms;
      first-side end portions which extend from first ends of the bridge bodies to the tongue, and which are fixed to the metal base at the pair of supporting portions, respectively; and
      second-side end portions which extend from second ends of the bridge bodies to the unsupported conductive circuit portions, and which are connected to outsides of the curved bendable portions, respectively.

2. The suspension of claim 1, wherein each of opening portions is defined by a corresponding bridge body and a corresponding unsupported conductive circuit portion.

3. The suspension of claim 1, wherein the tongue comprises:
   a first tongue portion on which a leading-side portion of the slider is disposed;
   a second tongue portion on which a trailing-side portion of the slider is disposed; and
   a hinge portion which is formed between the first tongue portion and the second tongue portion, which is narrower than the first and second tongue portions, and which pivotably connects the first tongue portion and the second tongue portion.

4. The suspension of claim 3, further comprising limiter members formed of a resin, which is the same material as the resin of the bridge members, wherein each of the limiter members is arranged between the second tongue portion and a stationary part of the flexure.

* * * * *